(12) United States Patent
Germain et al.

(10) Patent No.: US 11,151,287 B2
(45) Date of Patent: Oct. 19, 2021

(54) SYSTEM AND METHOD FOR MANAGING REQUESTS IN AN ASYNCHRONOUS PIPELINE

(71) Applicants: STMicroelectronics SA, Montrouge (FR); INSTITUT POLYTECHNIQUE DE GRENOBLE, Grenoble (FR)

(72) Inventors: Sophie Germain, Grenoble (FR); Sylvain Engels, Meylan (FR); Laurent Fesquet, Sassenage (FR)

(73) Assignees: STMICROELECTRONICS SA, Montrouge (FR); INSTITUT POLYTECHNIQUE DE GRENOBLE, Grenoble (FR)

( * ) Notice: Subject to any disclaimer, the term of this patent is extended or adjusted under 35 U.S.C. 154(b) by 402 days.

(21) Appl. No.: 16/213,500

(22) Filed: Dec. 7, 2018

(65) Prior Publication Data

US 2020/0184110 A1 Jun. 11, 2020

(51) Int. Cl.
| | |
|---|---|
| G06F 21/00 | (2013.01) |
| G06F 21/72 | (2013.01) |
| G06F 21/75 | (2013.01) |
| G06F 21/60 | (2013.01) |
| H03K 5/14 | (2014.01) |
| G06F 21/77 | (2013.01) |
| H03K 5/00 | (2006.01) |
| H03K 19/20 | (2006.01) |

(52) U.S. Cl.
CPC .......... *G06F 21/72* (2013.01); *G06F 21/602* (2013.01); *G06F 21/755* (2017.08); *G06F 21/77* (2013.01); *H03K 5/14* (2013.01); *H03K 19/20* (2013.01); *H03K 2005/00019* (2013.01)

(58) Field of Classification Search
CPC ......... H04L 9/002; H04L 9/003; H04L 9/004; H04L 9/005; G06F 21/71; G06F 21/72; G06F 21/75; G06F 21/755; G06F 21/76
See application file for complete search history.

(56) References Cited

U.S. PATENT DOCUMENTS

| | | | | |
|---|---|---|---|---|
| 2002/0057121 A1* | 5/2002 | Lee | ..................... | H03K 19/0027 327/261 |
| 2004/0046590 A1* | 3/2004 | Singh | ..................... | G06F 9/3869 326/93 |
| 2009/0307516 A1* | 12/2009 | Renaudin | ............... | H03K 5/133 713/401 |

* cited by examiner

Primary Examiner — Edward Zee
(74) Attorney, Agent, or Firm — Slater Matsil, LLP

(57) ABSTRACT

An asynchronous pipeline circuit includes: a first processing stage including a first data latch configured to generate a request signal; a second processing stage downstream the first processing stage and including a second data latch; and a programmable delay line coupled between the first data latch and the second processing stage. The programmable delay line is configured to receive the request signal from the first data latch and to generate a delayed request signal by randomly delaying the request signal on each data transfer from the first data latch to the second data latch.

20 Claims, 8 Drawing Sheets
(2 of 8 Drawing Sheet(s) Filed in Color)

SYSTEM AND METHOD FOR MANAGING REQUESTS IN AN ASYNCHRONOUS PIPELINE

TECHNICAL FIELD

This disclosure relates generally to asynchronous pipelines and, in particular embodiments, to a system and method for managing requests in an asynchronous pipeline.

BACKGROUND

Cryptographic systems generally owe their security to the fact that a particular piece of information is kept secret. When a cryptographic algorithm is designed, it is usually assumed that a potential attacker has access to only the public values. Without the secret information it is computationally infeasible to break the scheme or the algorithm. Once an attacker is in possession of a piece of secret information, they may be able to forge the signature of the victim and also decrypt secret messages intended for the victim. Thus, it is of importance to maintain the secrecy and integrity of the secret information in the system.

Secret information is generally stored within a secure boundary in the memory space of the cryptographic processor, making it difficult for an attacker to gain direct access to the secret information. Manufacturers incorporate various types of tamper-proof hardware to prevent illicit access to the secret information. In order to decide how much tamper-proofing to implement in the cryptographic system, the designers must consider the resources available to a potential attacker and the value of the information being protected. The magnitude of these resources is used to determine how much physical security to place within the device to thwart attackers who attempt to gain direct access to the secure memory. Tamper-proof devices can help prevent an attacker who is unwilling or unable to spend large amounts of time and money from gaining direct access to the secret information in the cryptographic system. Typically, the amount of work that is required to defeat tamper proof hardware exceeds the value of the information being protected.

However, a new class of attacks has been developed on cryptographic systems that are relatively easy and inexpensive to mount in practice, since they ignore the tamper-proof hardware. Recent attacks on cryptographic systems have shown that devices with secure memory may leak information that depends on the secret information, for example in the power usage of a processor computing with private information. Such attacks take advantage of information provided by an insecure channel in the device by using the channel in a method not anticipated by its designers, and so render redundant any tamper proofing in the device. Such insecure channels can be the power supply, electromagnetic radiation, or the time taken to perform operations. At particular risk are portable cryptographic tokens, including smart cards, pagers, personal digital assistants, and the like. Smart cards are especially vulnerable since they rely on an external power supply, whose output may be monitored non-intrusively. Access to the power supply is required for proper functioning of the device and so is not usually prevented with tamper-proof hardware.

Further, constrained devices tend not to have large amounts of electromagnetic shielding. Since the device is self-contained and dedicated, the power consumption and electromagnetic radiation of the smart card may be monitored as the various cryptographic algorithms are executed.

Thus, in a constrained environment, such as a smart card, it may be possible for an attacker to monitor an unsecured channel that leaks secret information. Such monitoring may yield additional information that is intended to be secret which, when exposed, can significantly weaken the security of a cryptographic system.

In response to the existence of such unsecured channels, manufacturers have attempted to minimize the leakage of information from cryptographic devices. However, certain channels leak information due to their physical characteristics and so it is difficult to completely eliminate leakage. A determined attacker may be able to glean information by collecting a very large number of samples and applying sophisticated statistical techniques. In addition, there are severe restrictions on what can be done in hardware on portable cryptographic tokens that are constrained in terms of power consumption and size. As a result, cryptographic tokens are particularly vulnerable to these types of attacks using unsecured channels.

The more recent attacks using the power supply that can be performed on these particularly vulnerable devices are simple power analysis, differential power analysis, higher order differential power analysis, and other related techniques. These technically sophisticated and extremely powerful analysis tools may be used by an attacker to extract secret keys from cryptographic devices. It has been shown that these attacks can be mounted quickly and inexpensively, and may be implemented using readily available hardware.

The amount of time required for these attacks depends on the type of attack and varies by device. For example, it has been shown that simple power analysis (SPA) typically takes a few seconds per card, while differential power analysis (DPA) can take several hours. In order to perform SPA, the attacker usually only needs to monitor one cryptographic operation. To perform DPA, many operations must be observed. In one method, in order to monitor the operations, a small resistor is connected in series to smart card's power supply and the voltage across the resistor is measured. The current used can be found by a simple computation based on the voltage and the resistance. A plot of current against time is called a power trace and shows the amount of current drawn by the processor during a cryptographic operation. Since cryptographic algorithms tend to perform different operations having different power requirements depending on the value of the secret key, there is a correlation between the value of the secret key and the power consumption of the device.

Laborious but careful analysis of end-to-end power traces can determine the fundamental operation performed by the algorithm based on each bit of a secret key, and thus, be analyzed to find the entire secret key, compromising the system. DPA primarily uses statistical analysis and error correction techniques to extract information that may be correlated to secret keys, while the SPA attacks use primarily visual inspection to identify relevant power fluctuations. In SPA, a power trace is analyzed for any discernible features corresponding to bits of the secret key. The amount of power consumed varies depending on the executed microprocessor instructions. For example, in a typical "square-and-multiply" algorithm for exponentiation, a bit 1 in the exponent will cause the program to perform both squaring and multiply operations, while a bit 0 will cause the multiply operation to be skipped. An attacker may be able to read off the bits of a secret exponent by detecting whether the multiply operation is performed at different bit positions.

A DPA attack attempts to detect more subtle features from the power traces and is more difficult to prevent. To launch a DPA attack, a number of digital signatures are generated and the corresponding power traces are collected. The power trace may be regarded as composed of two distinct parts, namely signal and noise. The patterns that correspond to private key operations tend to remain more or less constant throughout all power traces. These patterns may be regarded as the signal. The other parts of the computation, which correspond to changing data, result in differing patterns in each power trace. These patterns can be regarded as the noise. Statistical analysis can be performed on all the power traces to separate the signal from the noise. The secret value is then derived using the identified signal.

Accordingly, there is a need for a system and method for reducing the risk of a successful power analysis attack and which is particularly applicable to current hardware environments.

SUMMARY

An asynchronous pipeline circuit includes: a first processing stage including a first data latch configured to generate a request signal; a second processing stage downstream the first processing stage and including a second data latch; and a programmable delay line coupled between the first data latch and the second processing stage, wherein the programmable delay line is configured to receive the request signal from the first data latch and to generate a delayed request signal by randomly delaying the request signal on each data transfer from the first data latch to the second data latch.

An asynchronous pipeline circuit includes a first processing stage and a second processing stage downstream from the first processing stage. The first processing stage includes: a first data latch configured to receive data and to generate a request signal; and a first controller configured to control outputting of the data from the first data latch. The second processing stage includes: a second data latch configured to receive the data from the first data latch; and a second controller configured to control outputting of the data from the second data latch. The asynchronous pipeline circuit further includes a programmable delay line coupled between the first processing stage and the second processing stage, wherein the programmable delay line is configured to receive the request signal from the first data latch and to generate a randomly-delayed request signal by delaying the request signal by a random time on each data transfer from the first data latch to the second data latch. The asynchronous pipeline circuit additionally includes a random number generator configured to generate a random number, and wherein the programmable delay line is configured to randomly delay the request signal based on the random number.

A method for managing requests in an asynchronous pipeline circuit, includes: generating, by a first data latch of a first processing stage of the asynchronous pipeline circuit, a request signal; delaying, by a programmable delay line, the request signal by a random delay; receiving the randomly-delayed request signal at a second processing stage downstream the first processing stage and including a second data latch; and providing, by the second processing stage, an acknowledgement signal to the first processing stage in response to reception of the randomly-delayed request signal and in response to reception of data from the first data latch, wherein the delaying occurs at each data transfer from the first data latch to the second data latch.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
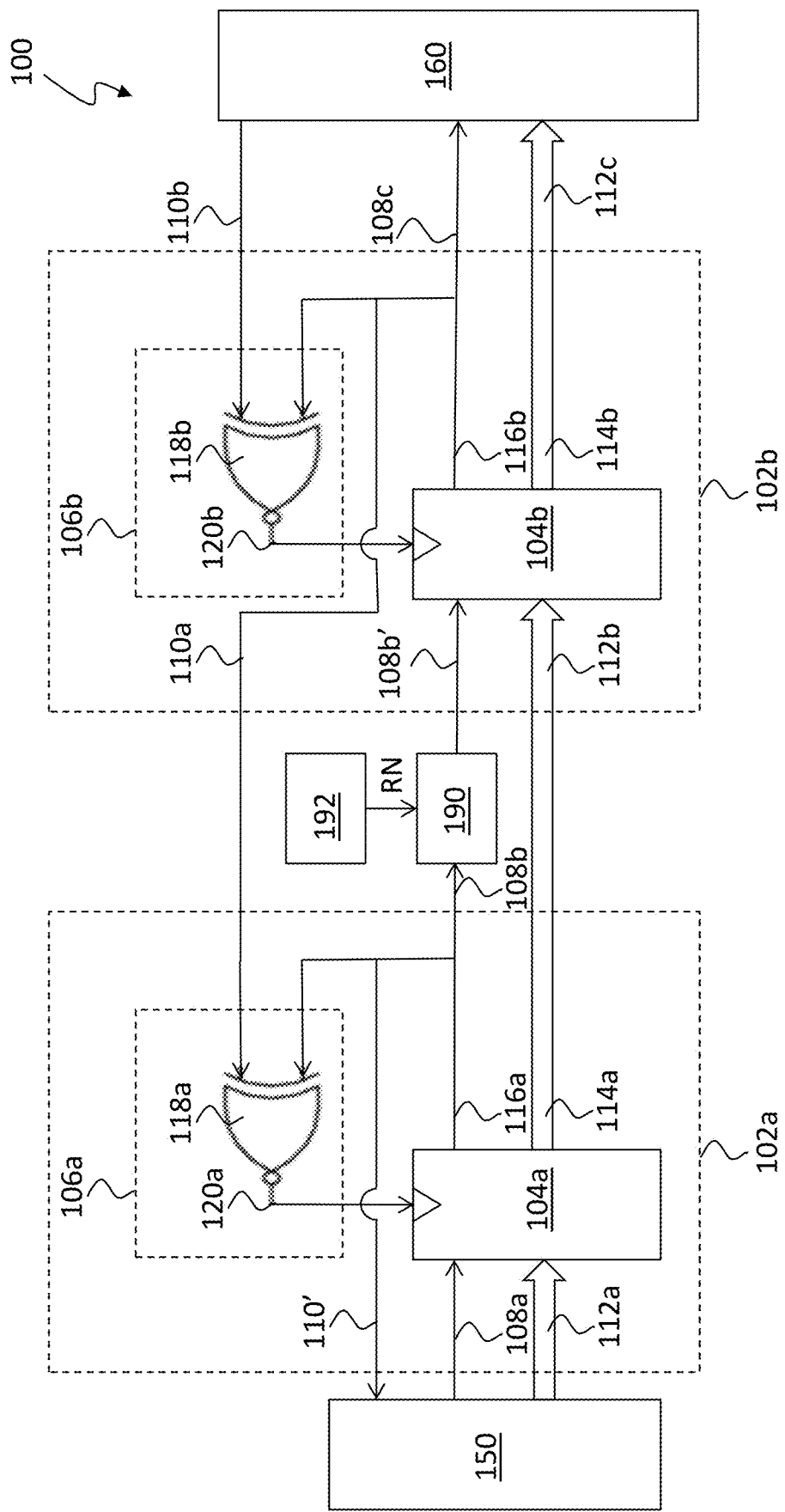
FIG. 1 shows an asynchronous pipeline, in accordance with an embodiment.

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Extracting information from circuit elements, such as registers, gates, buffers and switches, within an integrated circuit (IC) device enables unauthorized parties to gain access to secure or secret information that is stored or generated within the IC device.

Information may be extracted via side-channel attacks, meaning that the information is extracted without actually making electrical contact with the conductors in the circuit elements of the IC device that carry this information. Side-channel techniques include, for example, non-invasively measuring electrical signals of circuit elements of the IC device by power analysis. Side-channel techniques also include non-invasively measuring electromagnetic (EM) radiation emitted from circuit elements of the IC device. These techniques take advantage of the fact that many circuit elements, such as CMOS elements, inside the IC device consume power and may emit spikes in EM radiation mainly during transitions of logic elements, i.e., changing their values from 0 to 1 or from 1 to 0.

Based on this principle, an unauthorized party may measure power consumption or emitted EM radiation while causing a circuit element of the IC device to cycle between a known state (such as all bits=0, or a default value determined by reverse engineering) and an unknown state in which the element holds a secret value. Such attacks may be carried out by taking control of the software, inducing repeated resets, or repeated application of power "glitches," for example. As a result of such attacks, side-channel signals (e.g. spikes in power consumption or EM radiation) are generally generated by all the bits that make a transition, because their secret values are different from the corresponding bits in the known value, while no (or extremely weak) signals are emitted from all the bits whose values do not change. Sensing these signals thus enables the attacker to infer the secret value by comparison with the known value.

A typical example of where covert monitoring of side-channel signals may reveal information to an unauthorized third party is in smartcard security. Smartcards employ encryption techniques to ensure that neither a PIN number nor an encryption private key is revealed to any party other than the authorized user. The key in the encryption scheme may be readable by monitoring smartcard power supply current using techniques such as simple power analysis, differential power analysis, and higher order differential power analysis, thereby rendering the security worthless.

The side-channel signals that are acquired by the above-described examples typically have signal amplitudes so low that they cannot be read reliably from a single measurement. Therefore, it is generally necessary for an unauthorized third party to repeat the measurements many times and integrate the measurement results in order to collect a signal that is strong enough to be useful for subsequent analysis.

The circuit elements inside an IC device typically include one or more digital processing systems. High performance digital processing systems typically utilize pipelining to increase parallel performance and throughput, with such pipelining being implemented as a synchronous pipeline or an asynchronous pipeline. Embodiments of the present disclosure are directed to IC devices including circuit elements having asynchronous pipeline architectures that have no global clock and that advance data by coordinating, on a local per-stage basis, a handshaking protocol. Embodiment circuits aim to foil side-channel attacks by at least pseudo-randomly changing the EM emission spectrum of the circuit elements inside the IC device at each data transfer so that even if an unauthorized third party repeats measurements a plurality of times and attempts to integrate the measurement results in order to collect a signal that is strong enough to be useful for subsequent analysis, the resultant signal is unusable since its spectrum substantially resembles the spectrum of white noise.

FIG. 1 shows an asynchronous pipeline 100, in accordance with an embodiment of the present disclosure. The pipeline 100 accepts data from an input stage 150 and outputs data to an output stage 160. In the example of FIG. 1, two pipeline stages are shown for the sake of simplicity, e.g., first stage 102a and second stage 102b. In some embodiments, the input stage 150 may be additional pipeline stages that occur before the first stage 102a, and the output stage 160 may be additional pipeline stages that occur after the second stage 102b. Each stage 102a, 102b includes a respective data latch 104a, 104b and a respective controller 106a, 106b. Since the pipeline 100 is an asynchronous pipeline, each stage 102a, 102b communicates only with immediately-neighboring stages and is clocked by its respective controller 106a, 106b. In the example of FIG. 1, data propagates along the pipeline from the input stage 150 to the first stage 102a, from the first stage 102a to the second stage 102b, and from the second stage 102b to the output stage 160.

The stages 102a, 102b communicate with each other using a handshaking protocol. In particular, request signal 108b is outputted from the first stage 102a to the second stage 102b in a first direction. Furthermore, acknowledgment signal 110a is outputted from the second state 102b to the first stage 102a in a second direction. In FIG. 1, the request signal 108a is received at the first stage 102a from the input stage 150, and request signal 108c is passed from the second stage 102b to the output stage 160. Similarly, acknowledgment signal 110' is passed from the first stage 102a to the input stage 150, and acknowledgment signal 110b is received at the second stage 102b from the output stage 160.

Figure 2A:
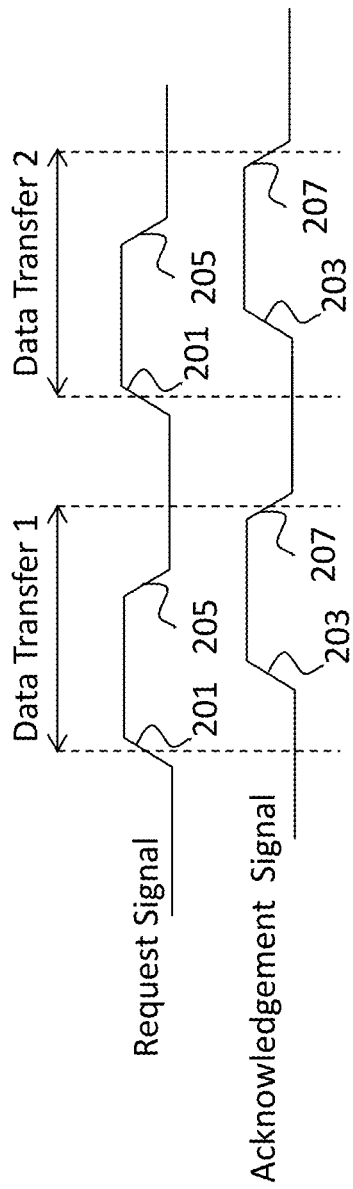
FIG. 2A illustrates a four-phase signaling handshaking protocol between successive stages of the asynchronous pipeline of FIG. 1.
Figure 2B:
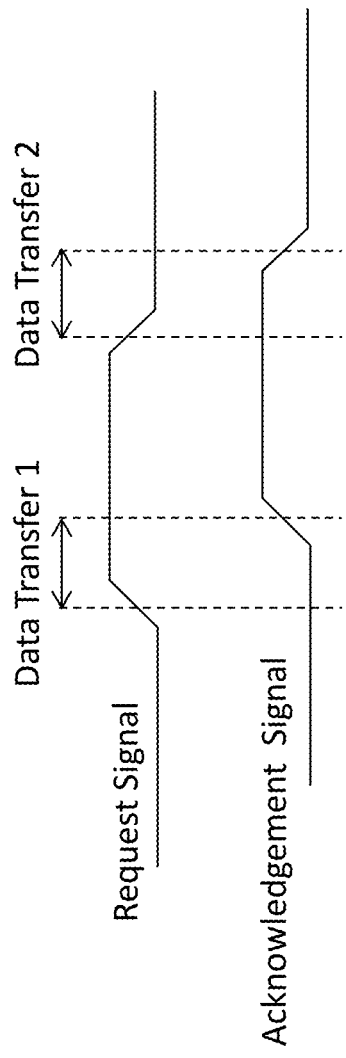
FIG. 2B illustrates a two-phase signaling handshaking protocol between successive stages of the asynchronous pipeline of FIG. 1.

The handshaking protocol between stages 102a, 102b may proceed as four-phase signaling or two-phase signaling. FIG. 2A illustrates an example of four-phase signaling, while FIG. 2B illustrates an example of two-phase signaling. Referring first to FIG. 2A, four-phase signaling includes four distinct temporal stages for each data transfer (two data transfers are shown in FIG. 2A, these data transfers being labeled as "Data Transfer 1" and "Data Transfer 2"). At a first temporal stage 201 for each data transfer, the sending stage (e.g. first stage 102a) activates its request signal (e.g. request signal 108b) for indicating to the receiving stage (e.g. second stage 102b) that it wishes to transfer data. At a second temporal stage 203 for each data transfer, the receiving stage (e.g. second stage 102b) activates its acknowledgement signal (e.g. acknowledgement signal 110a), thus synchronizing with the sending stage and indicating to the sending stage that it has received the data. At a third temporal stage 205 for each data transfer, the sending stage (e.g. first stage 102a) is free to deactivate its request signal (e.g. request signal 108b), and at a fourth temporal stage 207 for each data transfer, the receiving stage (e.g. second stage 102b) is also free to let its acknowledgement signal (e.g. acknowledgement signal 110a) return to its inactive state. As shown in FIG. 2A, first temporal stage 201 occurs prior to second temporal stage 203, which in turn occurs prior to third temporal stage 205, which in turn occurs prior to fourth temporal stage 207. Data transfer occurs only during the first two temporal phases 201, 203, while the latter two phases 205, 207 are used to allow the request and acknowledgement signals to return to their original logic levels.

Referring now to FIG. 2B, two-phase signaling includes two distinct temporal stages for each data transfer. In comparison to four-phase signaling, two-phase signaling does not have the overhead of having temporal phases to allow the request and acknowledgement signals to return to their original logic levels. Instead, as shown in FIG. 2B, transitions (e.g. either rising or falling edges on the request and acknowledgement signals) are used to indicate events. For example, as illustrated in the example of FIG. 2B, when the sending stage (e.g. first stage 102a) is ready to send data to the receiving stage (e.g. second stage 102b), the sending stage causes a transition (e.g. rising edge in FIG. 2B) on its request signal (e.g. request signal 108b). Once the receiving stage (e.g. second stage 102b) has received the data, it acknowledges this by causing a transition (e.g. rising edge in FIG. 2B) on its acknowledgement signal (e.g. acknowledgement signal 110a). The sending stage (e.g. first stage 102a) is now free to initiate another data transfer (e.g. indicated in FIG. 2B as "Data Transfer 2") to the receiving stage (e.g. second stage 102b). Since two-phase signaling uses transitions to indicate events, there is no logical difference between a rising and falling transition.

At this point, it is noted that whether two-phase signaling or four-phase signaling is used, embodiments of the present embodiment aim to randomize the time at which a request signal from a sending stage arrives at a receiving stage, in an attempt to obfuscate the spectrum of EM emissions of circuit elements inside the IC device at each data transfer. For example, a random delay can be added to the request signal 108*b* transmitted from first stage 102*a* to second stage 102*b*, thus yielding delayed request signal 108*b*'. Since circuit elements emit spikes in EM radiation mainly during transitions of logic elements, randomization of the delay of the request signal from the sending stage to the receiving stage randomizes the transitions of the stages of the pipeline 100 from one data transmission to the next and this manifests as randomized spikes in the spectrum of the EM radiation emitted by circuit elements of the IC device, which in turn frustrates attempts by an unauthorized third party to extract secure or secret information via side-channel attacks. The random delays may be added using a programmable delay line 190 coupled between successive stages 102*a*, 102*b*. The programmable delay line 190 adds a random time delay to the request signal 108*b* based on a random number RN that is generated by random number generating circuit 192 that is coupled to the programmable delay line 190.

Figure 7:
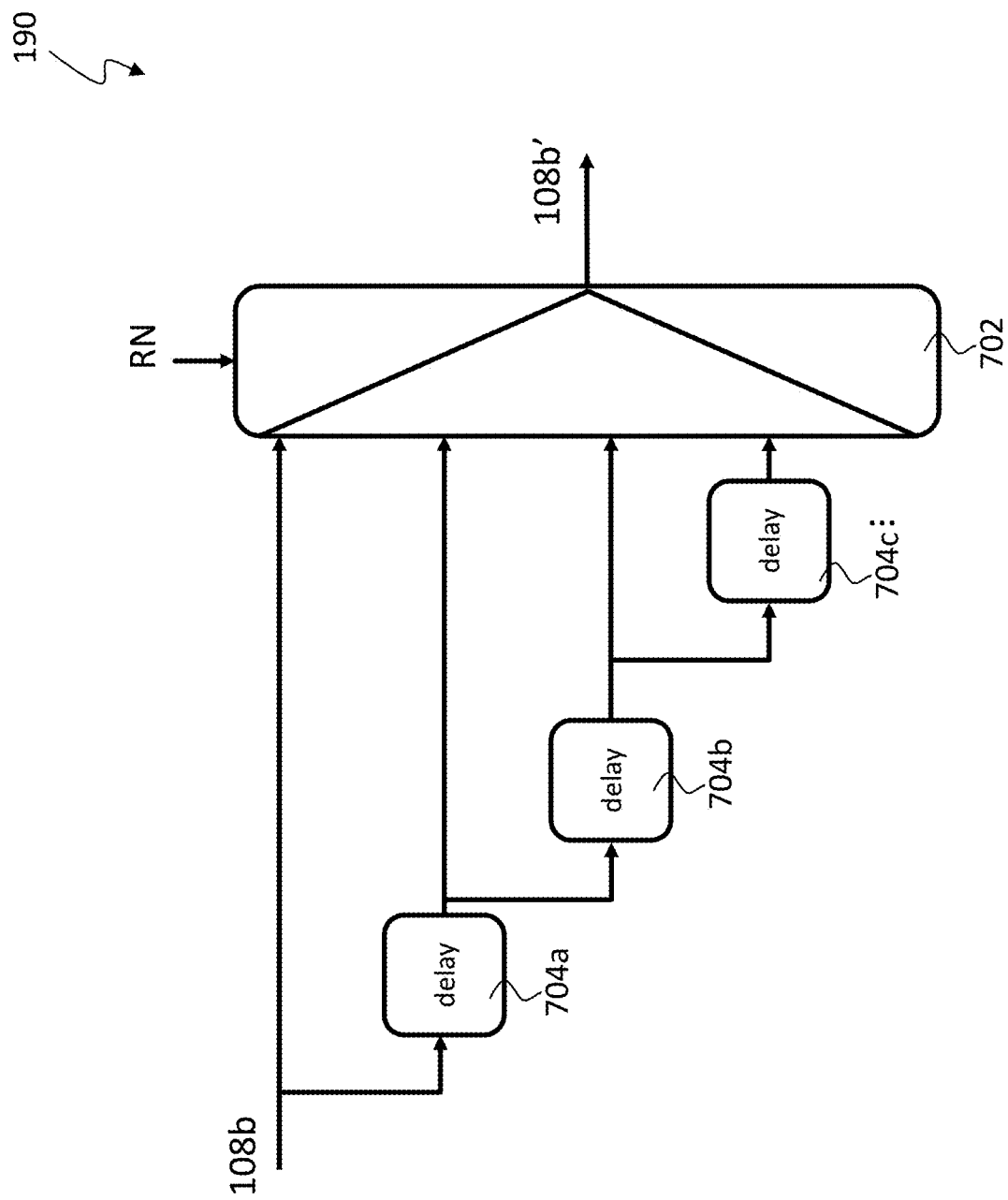
FIG. 7 shows a schematic of a programmable delay line, in accordance with an embodiment of the present disclosure.

FIG. 7 shows a possible implementation of the programmable delay line 190, in accordance with an embodiment. As shown in FIG. 7, the programmable delay line 190 includes a selection circuit 702 (e.g. a multiplexer) and a plurality (e.g. a cascade) of delay elements 704*a*, 704*b*, 704*c*. In the example of FIG. 7, three delay elements 704*a*, 704*b*, 704*c* are shown, but in other embodiments, there may be more than three delay elements included in the programmable delay line 190. The selection circuit 702 in configured to receive the request signal 108*b*, which is also provided as an input to first delay element 704*a*. The selection circuit 702 in configured to receive the output of the first delay element 704*a*, which output is also provided as an input to second delay element 704*b*. The selection circuit 702 in configured to receive the output of the second delay element 704*b*, which output is also provided as an input to third delay element 704*c*. The output of third delay element 704*c* is further provided as an input to the selection circuit 702. The selection circuit 702 is configured to selected one of its input signals based on the random number RN generated by random number generating circuit 192, and the selected input is provided as delayed request signal 108*b*'. In the implementation shown in FIG. 7, the delay between request signal 108*b* and delayed request signal 108*b*' may be in the range of 0.1 ns to 3.2 ns, with a step of 0.1 ns. However, it is noted that the range and the step of the delays can be different depending on the implementation and the architecture of the programmable delay line 190.

The data latches 104*a*, 104*b* are a bank of level-sensitive D-latches (e.g. including an inverter pair) that are normally transparent (namely, "enabled," which allows new data arriving at a respective data input 112*a*, 112*b* to pass through quickly to a respective data output 114*a*, 114*b*). The data latches 104*a*, 104*b* are enabled and disabled by respective latch enable signals 120*a*, 120*b* that are received from the respective controllers 106*a*, 106*b*. The data latches 104*a*, 104*b* also respectively produce done signals 116*a*, 116*b*, which are latched versions of request signals 108*a*, 108*b*', respectively, when the respective stage 102*a*, 102*b* has latched new data. Each data latch 104*a*, 104*b* is used for each data bit and generates its done signal 116*a*, 116*b* for each stage 102*a*, 102*b*.

A commonly-used asynchronous scheme, called "bundled data," may be used to encode the data path. According to the bundled-data scheme, the request signal from a previous stage (e.g. delayed request signal 108*b*') arrives at a subsequent stage (e.g. stage 102*b*) after the data inputs (e.g. data inputs 112*b*) have stabilized. Accordingly, the proposed use of a programmable delay line 190 to add a random delay to the request signal 108*b* to yield delayed request signal 108*b*' also ensures that the request signal from a previous stage (e.g. delayed request signal 108*b*') arrives at a subsequent stage (e.g. stage 102*b*) only after the data inputs (e.g. data inputs 112*b*) have stabilized. If the data has to go through a logic block before arriving at particular stage (e.g. second stage 102*b*), then the request signal 108*b* must be appropriately delayed by a further delay circuit prior to being delayed by the programmable delay line 190. This is discussed in greater detail below in reference to FIG. 4. Once second stage 102*b* has latched the new data, done signal 116*b* is produced, which is sent to its controller 106*b*, as well as to the first stage 102*a* as the acknowledgment signal 110*a*, and to output stage 160 as request signal 108*c*.

As mentioned above, the controller 106*a*, 106*b* enables and disables its respective data latch 104*a*, 104*b* with enable signal 120*a*, 120*b*, respectively. In the example of FIG. 1, each controller includes an exclusive NOR gate (e.g. XNOR gate 118*a*, 118*b*, having two inputs: the done signal from the current stage, and the acknowledgment signal from the subsequent stage). For example, XNOR gate 118*a* receives done signal 116*a* from first stage 102*a*, and acknowledgement signal 110*a* from second stage 102*b*.

The operation of the pipeline 100 of FIG. 1 proceeds as follows. Initially, when the pipeline 100 is empty, all the data latches 104*a*, 104*b* are transparent and all done signals 116*a*, 116*b*, all request signals 108*a*, 108*b*, and all acknowledgment signals 110*a*, 110*b* are low (e.g. logical 0). The pipeline 100 uses two-phase signaling, as an example. Thus, when the first data items flows through successive stages of the pipeline, it flips the values of all these signals exactly once (e.g., from low to high). Subsequently, the second data item flips all these signals once again (e.g., from high to low). Each transition, whether up or down, represents a distinct event, i.e., the arrival of a new data item.

Once a data item passes through a stage's data latch, three actions take place in parallel: (i) the data is passed forward from that stage to the subsequent stage for further processing, along with the corresponding request signal; (ii) an acknowledgment signal is sent from the stage to the previous stage, freeing it up to process the next data item; and finally (iii) the stage's latch itself is quickly closed (i.e., made opaque) to protect the current data from being overwritten by new data produced by the previous stage. Subsequently, when an acknowledgment signal is received by the stage from the subsequent stage, the latch in the stage is re-enabled (i.e., made transparent). For example, once a data item passes through the data latch 104*a* of first stage 102*a*, the following actions occur in parallel: (i) the data are passed forward to second stage 102*b*; (ii) the corresponding request signal 108*b* is passed forward to programmable delay line 190 and the randomly-delayed request signal 108*b*' is passed on to second stage 102*b* for further processing; (iii) the acknowledgment signal 110' is sent to input stage 150; and (iv) data latch 104*a* of first stage 102*a* is closed to protect the current data from being overwritten by new data produced by the input stage 150. Subsequently, the data latch 104*a* in the first stage 102*a* is re-enabled when the acknowledgment signal 110*a* is received from second stage 102*b*.

While the flow of data uses transition signaling, i.e., one transition on each request signal, done signal, and acknowledgement signal per data item, as described above, the data latches 104*a*, 104*b* require two transitions per data item: (i) one to capture data (make opaque) and (ii) one to release data (make transparent). The controller 106*a*, 106*b* controls the respective latch 104*a*, 104*b* based on the done signals 116*a*, 116*b* and acknowledgment signals 110*a*, 110*b*. For example, the first transition in second stage 102b takes place when data passes through the data latch 104b (i.e., the done signal 116b changes value); and the second transition in second stage 102b takes place when the same data passes through the subsequent output stage 160 (i.e., the acknowledgment signal 110b changes value). Thus, the XNOR gate 118a, 118b of each controller 106a, 106b acts like a phase converter, in the sense that it converts the transition signaling done signals and acknowledgment signals into level control for the transparent latches.

The controller 104a, 104b, including the XNOR gate 118a, 118b, respectively, is configured to act as an "equality tester." When two consecutive stages, e.g., first stage 102a and second stage 102b, have the same data item, the first stage 102a, is considered effectively "empty" by the controller, and its latch is enabled (i.e., made transparent). When the consecutive stages have distinct data items, the previous stage (e.g. first stage 102a) is considered effectively "full" by the latch controller, and its latch is disabled (i.e., made opaque). The data of first stage 102a and second stage 102b are compared by the XNOR which examines if the phases of the two data requests (116a and 110a) are the same. If they are, then the latch is enabled (i.e., remain transparent), if not, the latch is closed (i.e., made opaque).

Based on the above-described operation of the pipeline 100 of FIG. 1 and since circuit elements emit spikes in EM radiation mainly during transitions of logic elements, randomization of the delay of the request signal 108a from the sending stage to the receiving stage randomizes the transitions of the logic elements of the pipeline 100 and this manifests as randomized spikes in the spectrum of the EM radiation emitted by the IC device, which in turn frustrates attempts by an unauthorized third party to extract secure or secret information via side-channel attacks.

It is noted that in the example of FIG. 1, only two pipeline stages 102a and 102b are shown with the programmable delay line 190 and random number generating circuit 192 being coupled therebetween. It is noted, however, that in general, the pipeline 100 may include a plurality of programmable delay lines, each being coupled between successive stages of the pipeline 100. For example, in an embodiment where the output stage 160 is another stage of the pipeline having a similar structure as first stage 102a and/or second stage 102b, another programmable delay line 190 may be coupled between the second stage 102b and the output stage 160 so that such delay line may add a random delay to the request signal 108c generated by the second stage 102b.

Figure 3A:
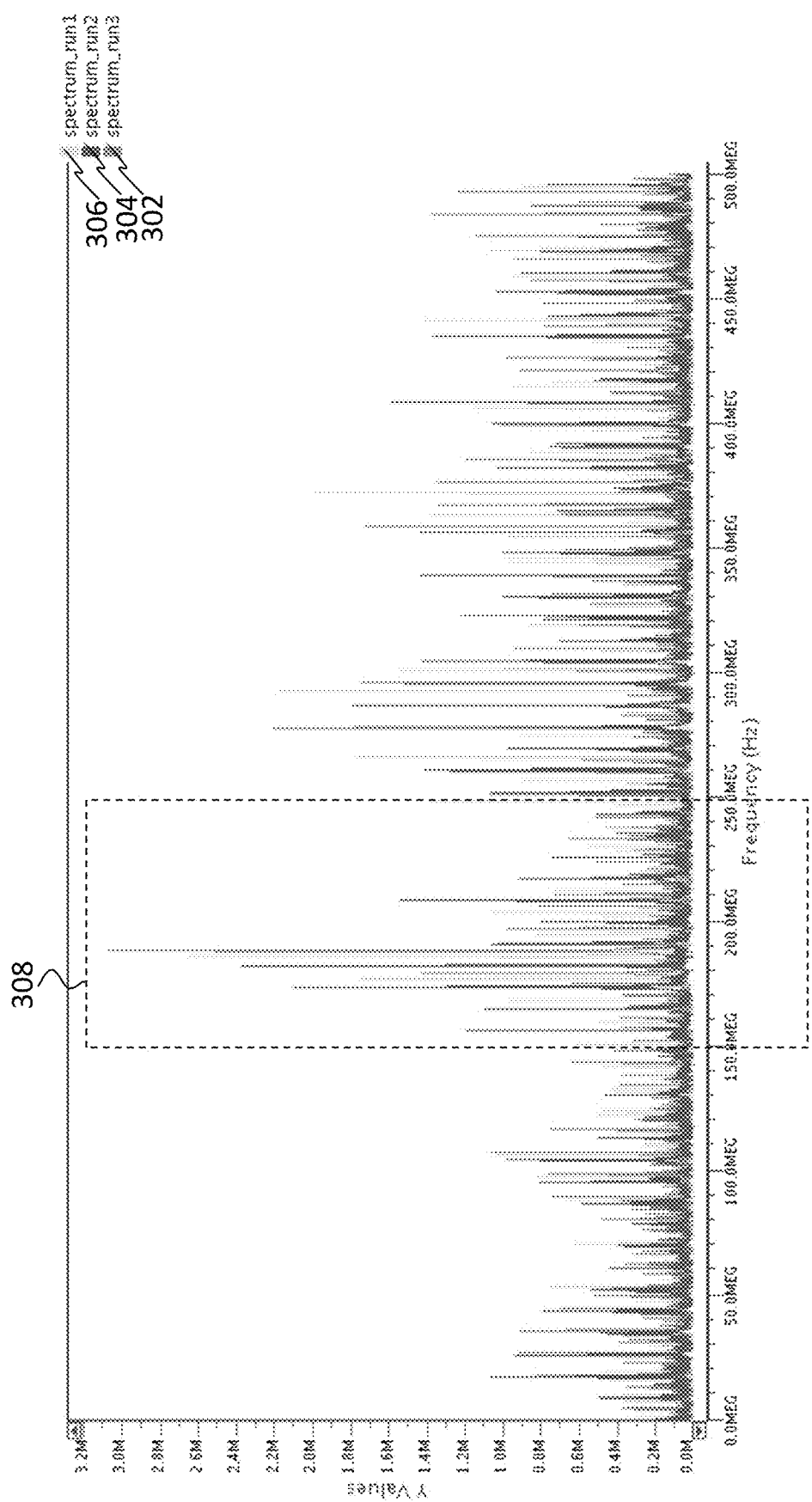
FIGS. 3A and 3B show experimental results obtained using the proposed pipeline architecture of FIG. 1 that includes a programmable delay line that adds a random delay to a request signal of the asynchronous pipeline.
Figure 3B:
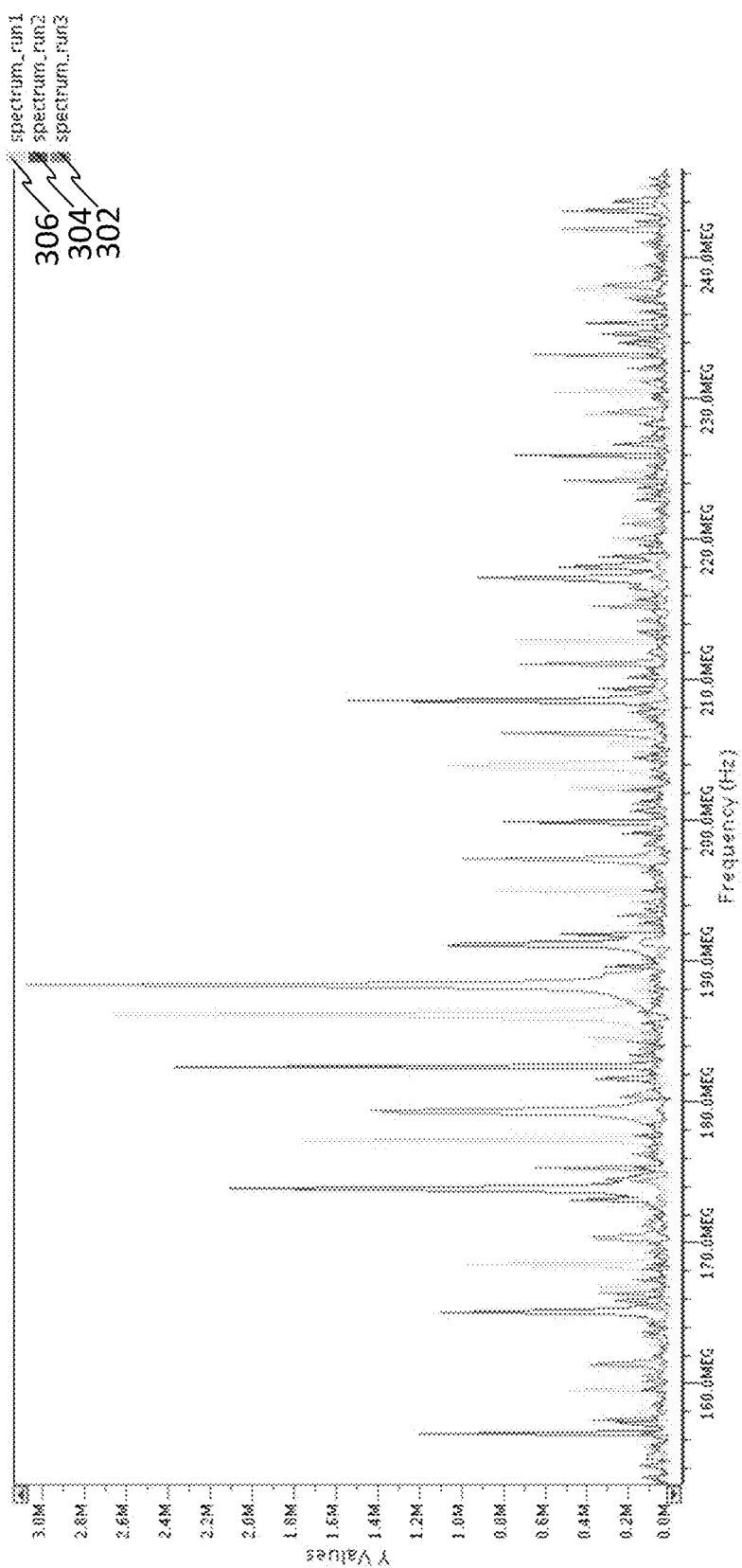

FIGS. 3A and 3B show experimental results obtained using the proposed pipeline architecture including the programmable delay line 190 that adds a random delay to the request signal 108a. In particular, FIGS. 3A and 3B show a plurality of spectra 302, 304, 306 of EM radiation from an IC device at three different transfers of the same data. The horizontal axis of FIGS. 3A and 3B illustrate frequency (e.g. in Hertz), while the vertical axis of FIGS. 3A and 3B illustrate magnitude of the spectra at a given frequency. FIG. 3B shows a zoomed in portion of region 308 of FIG. 3A. As observed in FIGS. 3A and 3B, the spectra 302, 304, 306 have prominent spikes at different frequency positions. Consequently, even if an unauthorized third party repeats measurements a plurality of times for the same data that is transferred through the pipeline 100 and attempts to integrate the measurement results in order to collect a signal that is strong enough to be useful for subsequent analysis, the resultant signal (e.g. the vector sum of spectra 302, 304, 306 on a per frequency-bin basis) is unusable since the spectrum of the resultant signal substantially resembles the spectrum of white noise.

Figure 4:
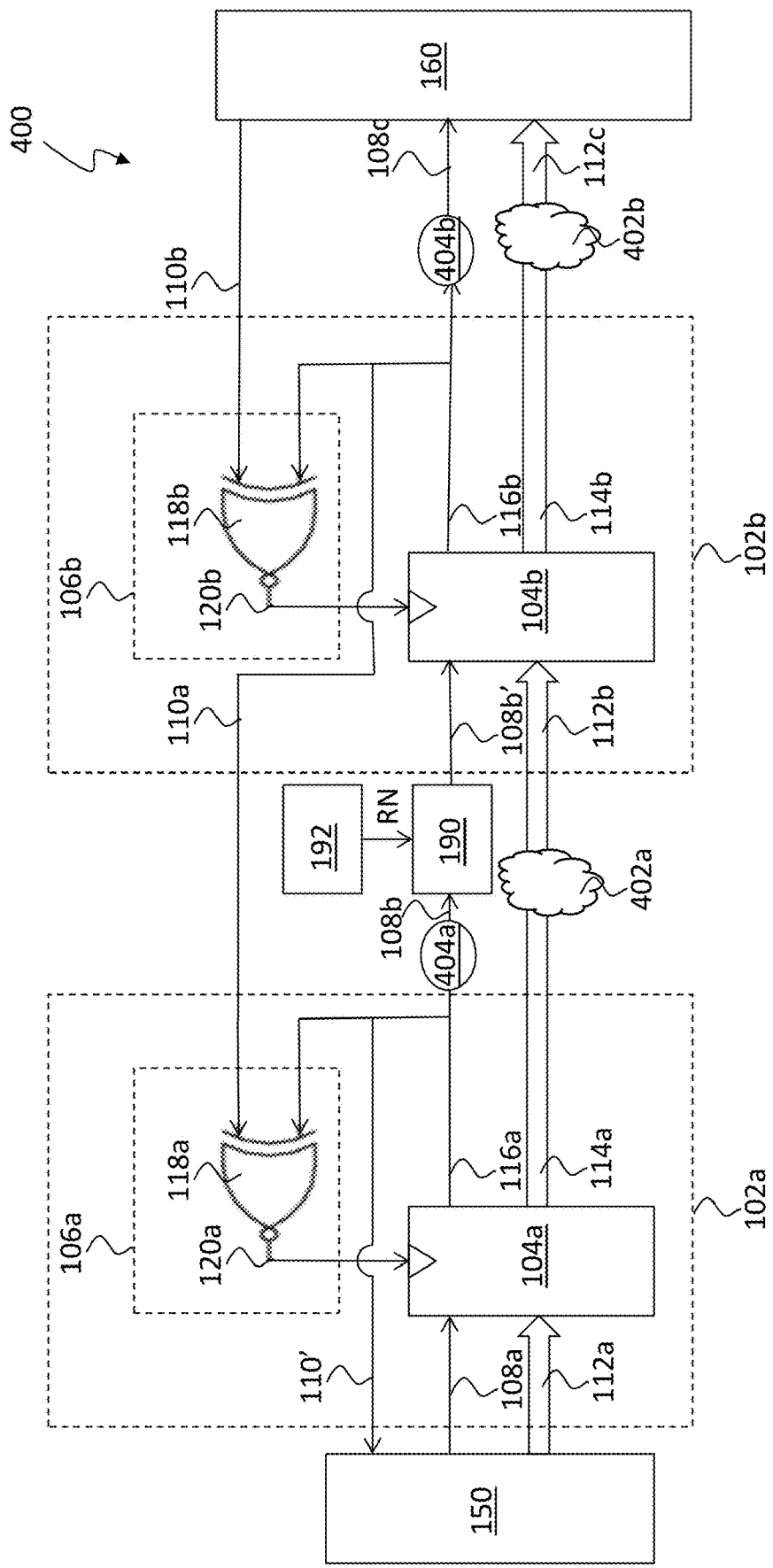
FIGS. 4, 5, and 6 show other asynchronous pipelines, in accordance with other embodiments of the present disclosure.

FIG. 4 shows an asynchronous pipeline 400, in accordance with another embodiment of the present disclosure. In pipeline 400, logic processing has been added between consecutive stages. Pipeline 400 is substantially identical to pipeline 100, with the differences noted herein. As with pipeline 100, pipeline 400 has several stages, e.g., first 102a, second stage 102b. As with pipeline 100, each stage 102a, 102b includes a respective data latch 104a, 104b and a respective controller 106a, 106b. The controller 106a, 106b includes a respective XNOR element 118a, 118b. In pipeline 400, blocks of combinational logic 402a, 402b and matching delay elements 404a, 404b are inserted between adjacent pipeline stages. For example, if a stage implements a 32-bit-wise OR function on two 32-bit operands, then the logic would include 32 two-input OR gates. The data path for each stage, e.g., first stage 102a, includes the passage of data from the data input 112a through latch 104a to data output 114a, and through combinational logic 402a to data input 112b for the next stage, e.g., second stage 102b.

The stages 102a, 102b communicate with each other using handshaking signals as discussed above in reference to FIG. 1. In the example of FIG. 4, the delay of the matched delay element 404a, 404b is applied to the done signal 116a, 116b to produce the corresponding request signal 108b, 108c. As shown in FIG. 4, the request signal 108b is subsequently randomly delayed by the respective programmable delay line 190 to generated delayed request signal 108b'. The standard asynchronous "bundled-data" scheme referenced above is also used in pipeline 400. As with pipeline 100, the request signal from a previous stage (e.g. request signal 108b) must arrive at a subsequent stage (e.g. stage 102b) after the data inputs (e.g. data inputs 112b) have stabilized. Therefore, the latencies of the delay elements 404a, 404b match the worst-case delay through the respective combinational logic block 402a, 402b. An advantage of this approach is that the data path itself can use standard single-rail (synchronous style) blocks, which are allowed to be hazardous, that is, transient glitches on the data inputs 112a, 112b, 112c are allowed, as long the request signal 108a, 108b, 108c arrives after data has stabilized. There are several ways to implement the matched delay elements 404a, 404b. In an embodiment, an inverter chain may be used. In another embodiment, a chain of transmission gates are used, with the number of gates and the transistor size determining the total delay. Yet another embodiment duplicates the worst-case critical paths of the combinational logic block 402a, 402b.

As with the embodiment of FIG. 1, since circuit elements emit spikes in EM radiation mainly during transitions of logic elements, randomization of the delay of the request signal from the sending stage to the receiving stage randomizes the transitions of the logic elements of the pipeline 400 and this manifests as randomized spikes in the spectrum of the EM radiation emitted by the IC device, which in turn frustrates attempts by an unauthorized third party to extract secure or secret information via side-channel attacks.

Figure 5:
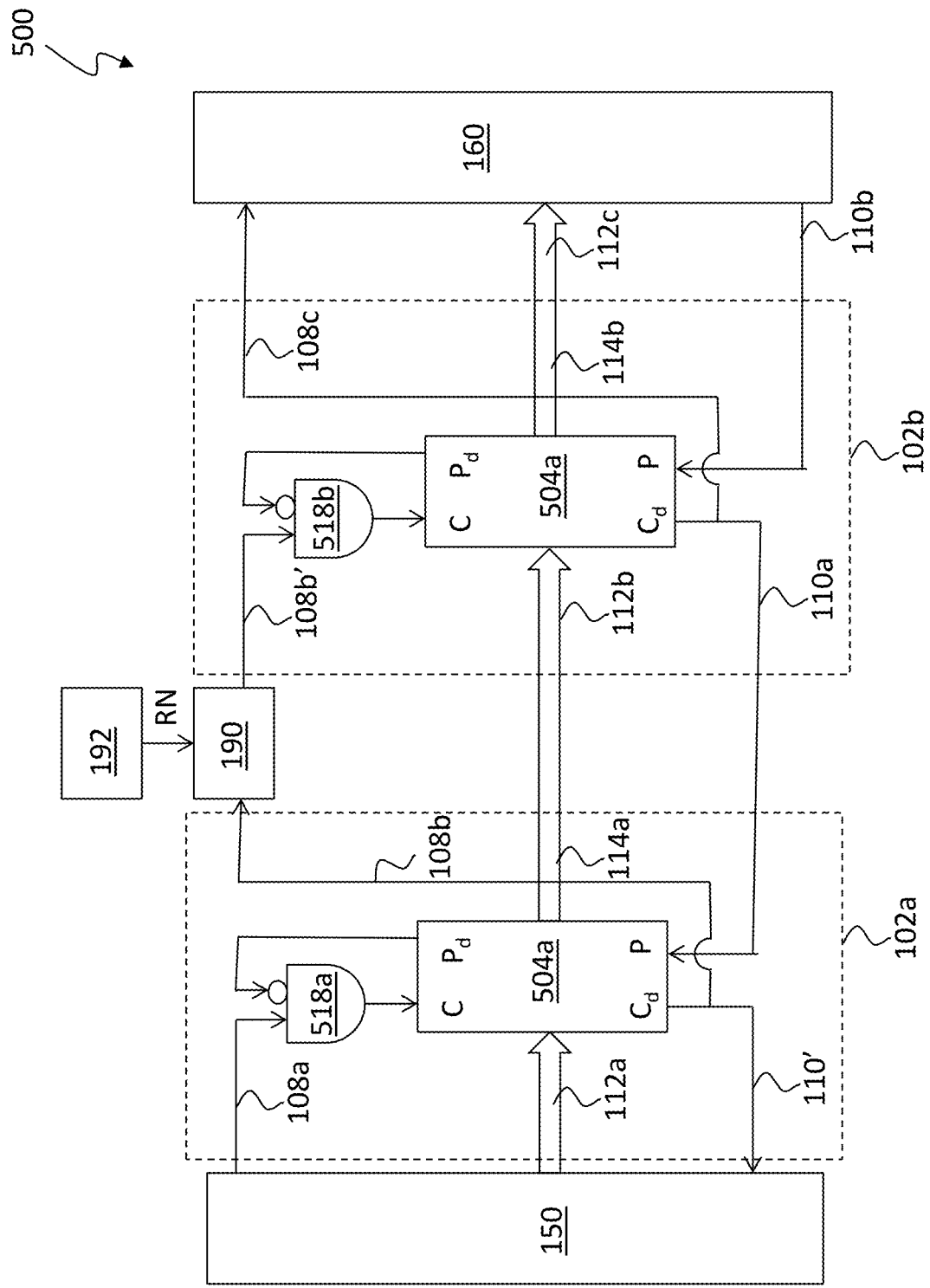

FIG. 5 shows an asynchronous pipeline 500, in accordance with yet another embodiment of the present disclosure. In pipeline 500, the data latches 104a, 104b are replaced by capture-pass latches 504a, 504b. Additionally, the controller for each stage 102a, 102b includes a two-input Muller C-element 518a, 518b (referred to herein as a two-input C-element). In a two-input C-element, if both inputs are low (e.g. logical 0), the output is low, and if both inputs are high (e.g. logical 1), the output is high; otherwise, the output maintains its previous value. In this design, one of the inputs of each C-element (e.g. the input receiving a signal from its respective capture-pass latch 504a, 504b) is inverted. As mentioned above, storage is achieved via specialized capture-pass latches 504a, 504b, which use transition-based control signals but provide transparent latch operation. Each latch 504a, 504b has two control inputs (C and P, denoting capture and pass, respectively) and two control outputs (Cd and Pd, denoting capture done and pass done, respectively). Initially, all signals are deasserted (e.g. logical 0), and the latches are transparent. A signal transition from low to high first arrives at the capture input C of the latches 504a, 504b, and the latches 504a, 504b become opaque. The capture output Cd then makes a transition from low to high after a hold time is satisfied, thus generating acknowledgement signal 110', 110a. Next, when a low to high transition arrives at the pass input P (e.g. acknowledgement signal 110a from a subsequent stage), the latches 504a, 504b become transparent again. The pass output Pd makes a transition from low to high after the hold time is satisfied. As a result, these signals are all asserted, and the transaction is complete. In this two-phase signaling protocol, for the next transaction, an identical operation occurs, but where the inputs and outputs will make the reverse transitions from high to low.

As illustrated in the example of FIG. 5, the acknowledgement signal generated by the latches 504a, 504b also serves as the request signal for the subsequent stage. For example, acknowledgement signal 110' from latch 504a serves as request signal 108b for the second stage 102b. As with the embodiments described above, the programmable delay line 190 adds a random time delay to the request signal 108b based on a random number that is generated by random number generating circuit 192 that is coupled to the programmable delay line 190, thereby generating delayed request signal 108b', which randomizes the switching of the two-input C-element 518b of the second stage 102b. In randomization of the delay of the request signal 108a from the sending stage to the receiving stage, the transitions of the logic elements of the pipeline 500 are randomized and this manifests as randomized spikes in the spectrum of the EM radiation emitted by the IC device, which in turn frustrates attempts by an unauthorized third party to extract secure or secret information via side-channel attacks.

Figure 6:
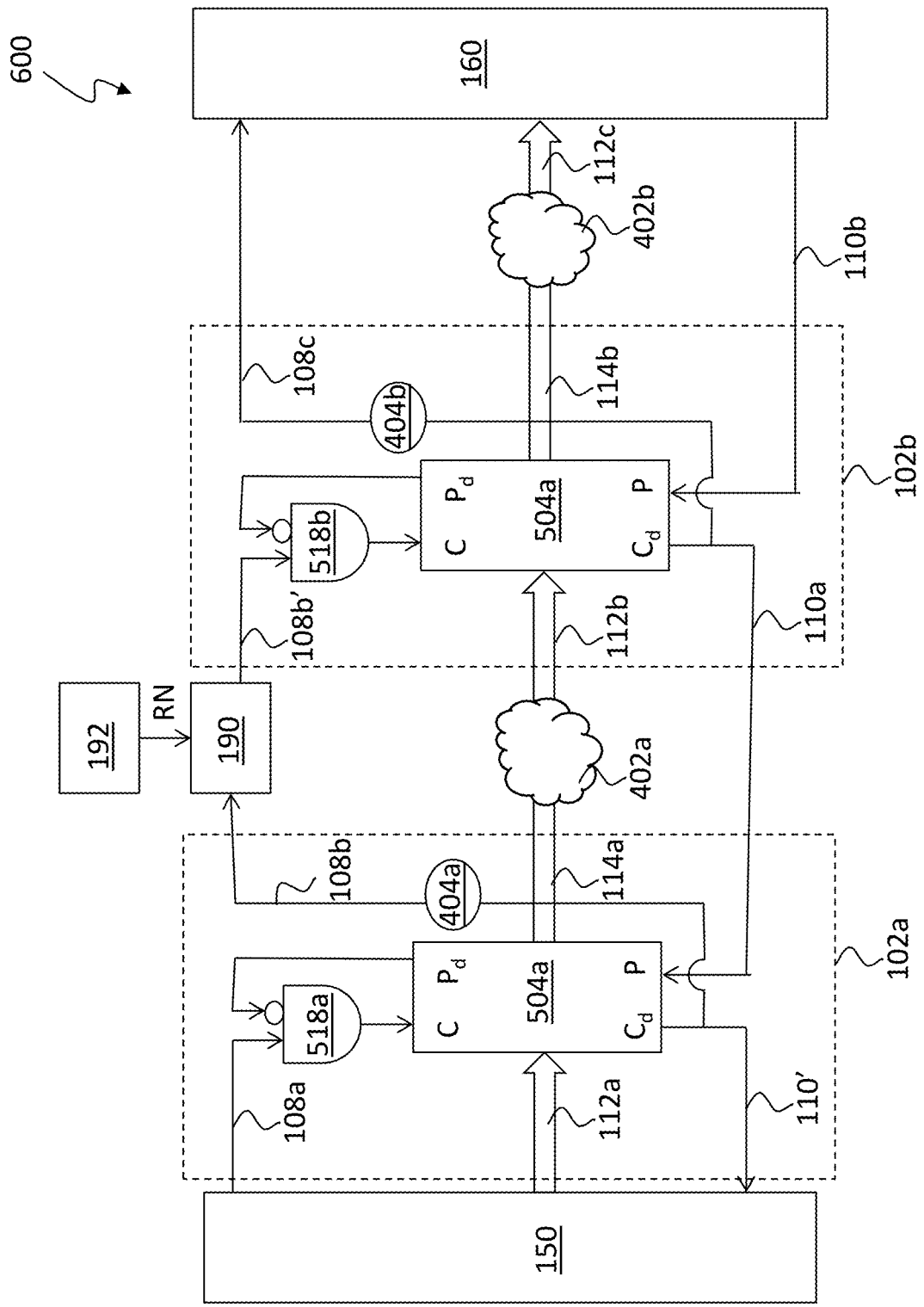

FIG. 6 shows an asynchronous pipeline 600, in accordance with another embodiment of the present disclosure. Pipeline 600 is substantially identical to pipeline 500, but with the addition of logic processing between consecutive stages 102a, 102b and matching delay elements 404a, 404b inserted between adjacent pipeline stages. As with the embodiment of FIG. 4, since circuit elements emit spikes in EM radiation mainly during transitions of logic elements, randomization of the delay of the request signal from the sending stage to the receiving stage randomizes the transitions of the logic elements of the pipeline 400 and this manifests as randomized spikes in the spectrum of the EM radiation emitted by the IC device, which in turn frustrates attempts by an unauthorized third party to extract secure or secret information via side-channel attacks.

In summary, embodiments of the present embodiment aim to randomize the time at which a request signal from a sending stage arrives at a receiving stage in an attempt to obfuscate the spectrum of EM emissions of circuit elements inside the IC device at each data transfer. For example, a random delay can be added to the request signal 108b transmitted from first stage 102a to second stage 102b, thus yielding delayed request signal 108b'. Since circuit elements emit spikes in EM radiation mainly during transitions of logic elements, randomization of the delay of the request signal from the sending stage to the receiving stage randomizes the transitions of the stages of the pipeline 100 from one data transmission to the next and this manifests as randomized spikes in the spectrum of the EM radiation emitted by circuit elements of the IC device, which in turn frustrates attempts by an unauthorized third party to extract secure or secret information via side-channel attacks. The random delays may be added using programmable delay line 190 coupled between successive stages 102a, 102b. The programmable delay line 190 adds a random time delay to the request signal 108b based on a random number that is generated by random number generating circuit 192 that is coupled to the programmable delay line 190.

An asynchronous pipeline circuit includes: a first processing stage including a first data latch configured to generate a request signal; a second processing stage downstream the first processing stage and including a second data latch; and a programmable delay line coupled between the first data latch and the second processing stage, wherein the programmable delay line is configured to receive the request signal from the first data latch and to generate a delayed request signal by randomly delaying the request signal on each data transfer from the first data latch to the second data latch.

An asynchronous pipeline circuit includes a first processing stage and a second processing stage downstream from the first processing stage. The first processing stage includes: a first data latch configured to receive data and to generate a request signal; and a first controller configured to control outputting of the data from the first data latch. The second processing stage includes: a second data latch configured to receive the data from the first data latch; and a second controller configured to control outputting of the data from the second data latch. The asynchronous pipeline circuit further includes a programmable delay line coupled between the first processing stage and the second processing stage, wherein the programmable delay line is configured to receive the request signal from the first data latch and to generate a randomly-delayed request signal by delaying the request signal by a random time on each data transfer from the first data latch to the second data latch. The asynchronous pipeline circuit additionally includes a random number generator configured to generate a random number, and wherein the programmable delay line is configured to randomly delay the request signal based on the random number.

A method for managing requests in an asynchronous pipeline circuit, includes: generating, by a first data latch of a first processing stage of the asynchronous pipeline circuit, a request signal; delaying, by a programmable delay line, the request signal by a random delay; receiving the randomly-delayed request signal at a second processing stage downstream the first processing stage and including a second data latch; and providing, by the second processing stage, an acknowledgement signal to the first processing stage in response to reception of the randomly-delayed request signal and in response to reception of data from the first data latch, wherein the delaying occurs at each data transfer from the first data latch to the second data latch.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The devices and processing systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a digital signal processor (DSP), an Application Specific Integrated Circuit (ASIC), a field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An asynchronous pipeline circuit, comprising:
a first processing stage comprising a first data latch, the first data latch configured to generate a request signal;
a second processing stage downstream the first processing stage, the second processing stage comprising a second data latch;
a data transfer line for transferring data from the first processing stage to the second processing stage, the data transfer line coupled between the first processing stage and the second processing stage; and
a programmable delay line coupled between the first data latch and the second data latch different from the data transfer line, wherein the programmable delay line is configured to receive the request signal from the first data latch and to generate a delayed request signal by randomly delaying the request signal from the first data latch to the second data latch for each data transferred along the data transfer line.

2. The asynchronous pipeline circuit of claim 1, wherein the second processing stage is configured to receive the delayed request signal and to provide an acknowledgment signal to the first processing stage in response to reception of the delayed request signal from the programmable delay line and in response to reception of data from the first data latch.

3. The asynchronous pipeline circuit of claim 2, wherein the first processing stage further comprises a first controller, and wherein the second data latch is configured to provide the acknowledgment signal to the first controller.

4. The asynchronous pipeline circuit of claim 3, wherein the programmable delay line is configured to provide the delayed request signal to the second data latch.

5. The asynchronous pipeline circuit of claim 2, wherein each of the first processing stage and the second processing stage comprises a respective Muller C-element, and wherein each of the first data latch and the second data latch comprises a respective capture-pass latch.

6. The asynchronous pipeline circuit of claim 5, wherein the programmable delay line is configured to provide the delayed request signal to the Muller C-element of the second processing stage.

7. The asynchronous pipeline circuit of claim 5, wherein the acknowledgment signal is configured to be passed from a control output of the capture-pass latch of the second processing stage to a pass input of the capture-pass latch of the first processing stage.

8. The asynchronous pipeline circuit of claim 1, further comprising a random number generator configured to generate a random number and to provide the random number to the programmable delay line.

9. The asynchronous pipeline circuit of claim 8, wherein the programmable delay line is configured to add a random delay to the request signal based on the random number to generate the delayed request signal.

10. The asynchronous pipeline circuit of claim 1, further comprising a delay element coupled between the first data latch and the programmable delay line, wherein the delay element is separate from the programmable delay line.

11. The asynchronous pipeline circuit of claim 10 wherein the asynchronous pipeline circuit further comprises combinatorial logic circuitry coupled between the first data latch and the second data latch.

12. An asynchronous pipeline circuit, comprising:
a first processing stage comprising:
a first data latch configured to receive data and to generate a request signal; and
a first controller configured to control outputting of the data from the first data latch;
a second processing stage comprising:
a second data latch configured to receive the data from the first data latch; and
a second controller configured to control outputting of the data from the second data latch;
a data transfer line for transferring data from the first processing stage to the second processing stage, the data transfer line coupled between the first processing stage and the second processing stage;
a programmable delay line coupled between the first processing stage and the second processing stage different from the data transfer line, wherein the programmable delay line is configured to receive the request signal from the first data latch and to generate a randomly-delayed request signal by delaying the request signal by a random time from the first data latch to the second data latch for each data transferred along the data transfer line; and a random number generator configured to generate a random number, wherein the programmable delay line is configured to randomly delay the request signal based on the random number.

13. The asynchronous pipeline circuit of claim 12, wherein the second processing stage is configured to receive the randomly-delayed request signal and to provide an acknowledgment signal to the first processing stage in response to reception of the randomly-delayed request signal from the programmable delay line and in response to reception of data from the first data latch.

14. The asynchronous pipeline circuit of claim 12, wherein each of the first data latch and the second data latch comprises a D-latch, and wherein each of the first controller and the second controller comprises a logic gate.

15. The asynchronous pipeline circuit of claim 14, wherein the logic gate comprises an exclusive NOR gate.

16. The asynchronous pipeline circuit of claim 12, wherein each of the first data latch and the second data latch comprises a capture-pass latch, and wherein each of the first controller and the second controller comprises a two-input Muller C-element.

17. The asynchronous pipeline circuit of claim 12, wherein the random time is between 0.1 ns and 3.2 ns.

18. A method for managing requests in an asynchronous pipeline circuit, the method comprising:
   generating, by a first data latch of a first processing stage of the asynchronous pipeline circuit, a request signal;
   delaying, by a programmable delay line, the request signal by a random delay;
   receiving the randomly-delayed request signal at a second processing stage downstream the first processing stage, the second processing stage comprising a second data latch; and
   providing, by the second processing stage, an acknowledgment signal to the first processing stage in response to reception of the randomly-delayed request signal and in response to reception of data from the first data latch, wherein the delaying occurs from the first data latch to the second data latch at each data transfer along a data transfer line different from the programmable delay line.

19. The method of claim 18, wherein the random delay is in steps of 0.1 ns.

20. The method of claim 18, wherein the random delay is between 0.1 ns and 3.2 ns.

* * * * *